United States Patent [19]

Shauger et al.

[11] 4,158,765
[45] Jun. 19, 1979

[54] TOTALIZER FOR TWO-WIRE TRANSMITTER

[75] Inventors: Herbert Shauger, Willow Grove; Roy Schmoock, Richboro, both of Pa.

[73] Assignee: Fischer & Porter Co., Warminster, Pa.

[21] Appl. No.: 849,696

[22] Filed: Nov. 8, 1977

[51] Int. Cl.² .................. G01F 1/32; H03K 25/00
[52] U.S. Cl. .................. 235/92 NT; 235/92 CA; 235/92 FL; 235/92 R; 340/210
[58] Field of Search ........ 235/92 NT, 92 FL, 92 CA; 340/210; 73/194 E; 364/733

[56] References Cited

U.S. PATENT DOCUMENTS 3,409,763  11/1968  Schoppe et al. ................ 235/92 NT
4,084,155  4/1978  Herzl et al. ........................ 340/210

Primary Examiner—Joseph M. Thesz
Attorney, Agent, or Firm—Michael Ebert

[57] ABSTRACT

An electronic totalizer interposable in the line of a two-wire transmitter having a transducer which converts a metered variable into a current signal that is conveyed over the line to a receiving station, the same line delivering direct current power from the station to the transducer and to the totalizer. The totalizer input circuit includes a resistor through which the current signal flows to produce a corresponding voltage signal, the voltage signal being applied to a resettable integrator to produce a time-integrated voltage which rises above a base level at a rate depending on the varying magnitude of the voltage. The rising integrated voltage is applied to a comparator having a threshold set by a reference voltage to produce an output signal when the integrated voltage reaches the threshold. The output signal is fed back to the integrator to effect resetting thereof to the base level, the output signal also serving to trigger a one shot generating a pulse which is applied to a digital counter. The number of pulses indicated by the counter display represents the time-integrated total of the metered variable.

7 Claims, 1 Drawing Figure

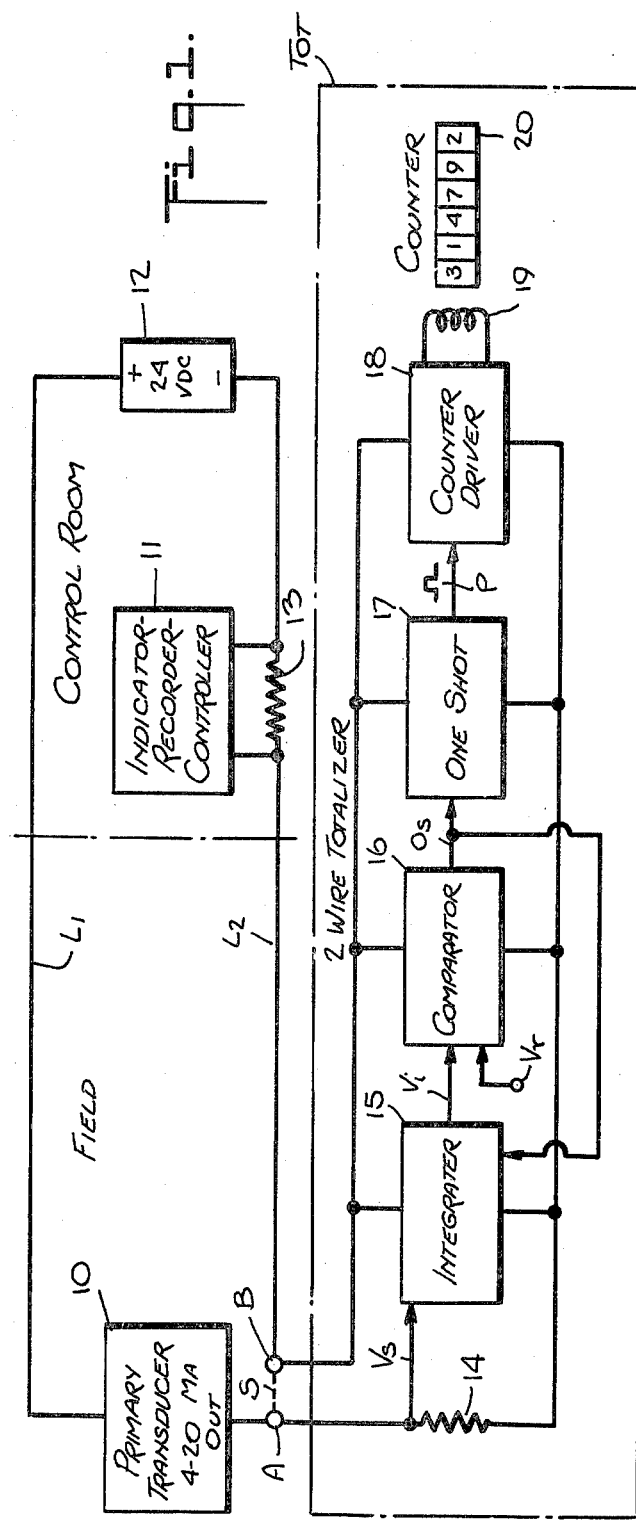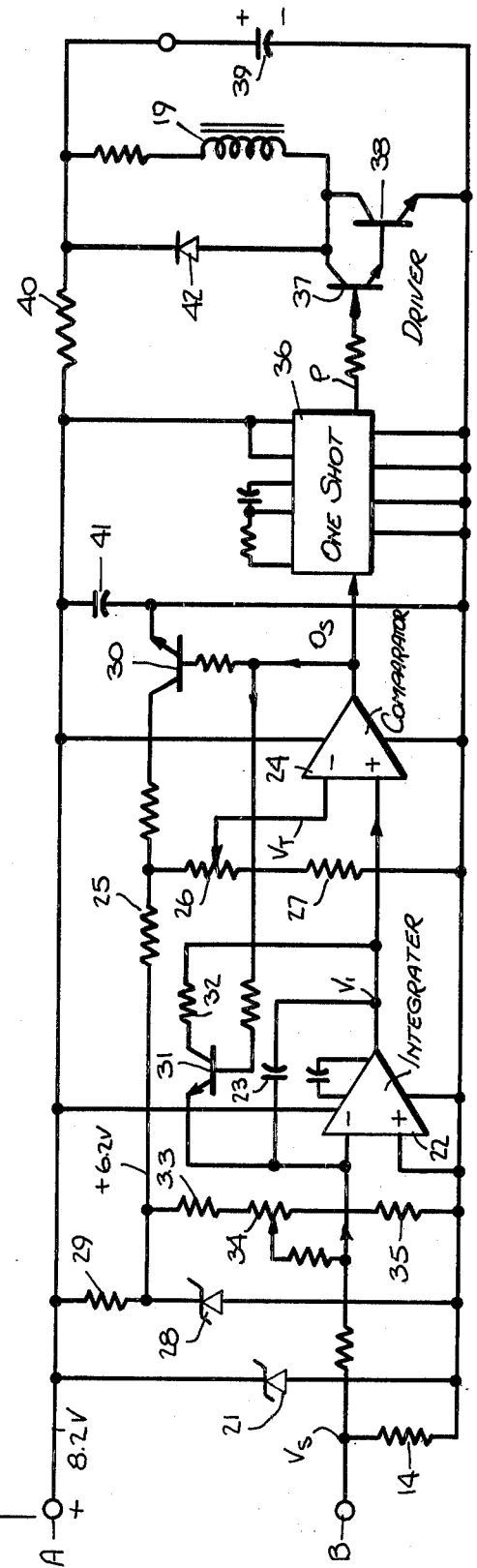

TOTALIZER FOR TWO-WIRE TRANSMITTER

BACKGROUND OF THE INVENTION

This invention relates generally to electronic totalizers, and more particularly to an electronic totalizer that is interposable in the signal line of a two-wire transmitter.

A two-wire transmitter of the type useful in process control applications includes a field-mounted transducer which converts the metered process variable, such as liquid level or flow rate, into a current signal that is conveyed over the two-wire line to a remote receiving station. The receiver at the remote station may also perform algebraic computations upon the current signal, such as multiplying and dividing prior to its utilization by controllers, indicators or recorders.

One important advantage of a two-wire transmitter is that the same line serves not only to convey the current signal from the transmitter to the remote receiving station but also to deliver a direct-operating voltage from a power supply at the station to the transducer, thereby obviating the need for extra wires. The current output of a two-wire transmitter minimizes its susceptibility to voltage noise spikes and eliminates line drop problems.

A typical, commercially-available, two wire transmitter making use of linear integrated circuits is the model LH 0045/LH0045 C two-wire transmitter manufactured by National Semi-conductor Corporation and described in their instruction bulletin covering this transmitter.

In many industrial applications for a two-wire transmitter, the metered value in rate form must be totalized for billing or other purposes to determine the total flow that has passed through the meter. While a total flow reading may be obtained by means of a separate totalizing counter system associated with the readout located in the control room, it has not heretofore been possible to incorporate a totalizer in a two-wire transmitter and to power the totalizer directly from the line without adversely affecting the normal operation of the transmitter.

SUMMARY OF INVENTION

In view of the foregoing, the principal object of this invention is to provide an electronic totalizer for a two-wire transmitter whereby the same line which carries a current from the transducer to the receiving station supplies power to the transducer and to the totalizer.

More particularly, it is an object of the invention to provide a totalizer of the above-type whose display indicates the time-integrated total of the metered variable, the operation of the totalizer in no way disturbing the normal operation of the two-wire transmitter.

Also an object of the invention is to provide a totalizer which effects time-integration of a process variable carried over a two-wire signal line, the totalizer having a non-destructive digital read-out.

A significant feature of the invention is that the totalizer may be interposed at any point in the two-wire line extending between a field-mounted transducer and a remote receiving station, so that the totalizer can be placed at the field installation, or at any intermediate point along the line leading to the receiving station as well as the receiving station itself.

Briefly stated, these objects are attained in an electronic totalizer which is interposable at any point in a two-wire transmitter whose transducer converts the metered variable into a corresponding current signal which is carried by the two-wire line to a receiving station that supplies operating power both to the transducer and to the totalizer over the same line.

The input circuit of the totalizer includes a resistor through which the line current signal passes to produce a corresponding voltage signal. The voltage signal is applied to a resettable integrator producing a time-integrated voltage that rises above a base level at a rate depending on the varying magnitude of the voltage signal.

The rising integrated voltage is applied to a comparator having a threshold set by a reference voltage to produce an output signal only when the integrated-voltage reaches the threshold. The output signal is fed back to the integrator to reset it to the base level, the output signal also functioning to trigger a one-shot to generate a pulse. This pulse is applied to a counter having a digital display, the number of pulses indicated by the counter representing the time-integrated total of the metered variable.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a standard two-wire transmitter operating in conjunction with an electronic totalizer in accordance with the invention; and FIG. 2 is a schematic circuit diagram of the preferred embodiment of the totalizer.

DESCRIPTION OF INVENTION

Two Wire Transmitter and Totalizer

Referring now to FIG. 1, there is shown a conventional two-wire transmitter including a primary transducer 10, a receiver 11 and a voltage source 12. The positive terminal of source 12 is connected over wire $L_1$ of a two-wire line to one side of the transducer while the negative terminal is connected to the other side of the transducer through a load resistor 13 interposed in line $L_2$, the line supplying operating power to the transducer. Receiver 11 is shunted across load resistor 13.

The totalizer in accordance with the invention, generally designated as TOT, is connected in series with wire $L_2$, this series connection being effected at terminals A and B which are joined together by an imaginary shunt S indicated by a dashed line to cut out the totalizer so that the operation of the standard two-wire transmitter can first be explained.

Transducer 10, which may be a flowmeter or any other field-mounted instrument responsive to a process variable, acts to meter the process variable to provide an output signal generally in the 4 to 20 mAdc range. Thus in the case of flow rate measurement, the higher the value of the current, the greater is the prevailing flow rate. The voltage source or power supply 12 and the receiver 11 linked by the two-wire line to the transducer are situated at a remote control room, the power supply normally being in the 24 to 50 V dc range.

Load resistor 13 in series with the line has a value of 250Ω to provide a standardized voltage range of 1 to 5 V dc for operating the voltage-sensitive receiver 11 which has a very high input resistance. Thus receivers can be connected in parallel across load resistor 13 or disconnected without affecting the accuracy of the other receivers. Receiver 11, as explained previously, is adapted to carry out indicator, recorder or controller functions.

Totalizer TOT, which is interposed in the two-wire transmitter line, has a relatively low input resistance and therefore has no perceptible effect on the normal operation of the transmitter. In other words, whether imaginary short S is in or out, the operation of the transmitter is essentially the same.

The totalizer includes a resistor 14 of low value (i.e., 50 ohms) in its input circuit, the resistor serving to convert the 4 to 20 mAdc current flow in the two-wire line to a varying signal voltage $V_s$ in a range of 0.2 to 1 Vdc. Thus for a transmitter signal of 4 mAdc at the lower end of the metered range, a signal voltage drop of 0.2 Vdc is produced across resistor 14, and for a transmitter signal of 20 mAdc, the signal voltage drop is 1 Vdc.

Signal voltage $V_s$ across resistor 14 is integrated in a resettable integrator 15 to produce an integrated voltage $V_i$ which rises from a base level as a time function of the magnitude of the signal voltage.

Integrated voltage $V_i$ is applied to a comparator 16 having a threshold set by a reference voltage $V_r$, the comparator producing an output signal $O_s$ when the integrated voltage reaches the threshold. Output voltage $O_s$ serves to actuate a one shot 17 to produce an output pulse P when the integrated voltage $V_i$ is equal to reference voltage $V_r$. Output signal $O_s$ is also fed back to integrator 15 to reset the integrator to its base level, and the integrator then proceeds to again integrate the incoming voltage $V_s$.

Pulse P from one shot 17 actuates the driver 18 of an electromagnetically-operated counter 19 having a digital display 20 which indicates the total number of applied pulses P.

Thus a pulse P is produced each instant the integrated voltage $V_i$ reaches the level of the reference voltage $V_r$, the time it takes to reach this level depending on the varying value of voltage signal $V_s$. Obviously, the higher the mean value of the metered variable, the sooner pulse P is produced to actuate the counter.

For example, if transducer 10 is a flowmeter and the parameters of the totalizer are such that the signal current in the two-wire line representing this flow is converted into a time-integrated voltage $V_i$ that gives rise to one pulse P for every 100 gallons of flow, then when the digital counter display 20 reads "30," this means that a total of 3,000 gallons has passed through the flowmeter.

Preferred Embodiment of Totalizer

Referring now to FIG. 2, there is schematically shown a totalizer whose input circuit is connected to terminals A and B interposed in the two-wire line of the transmitter. The signal current through the line flows through resistor 14 which is connected between terminal A and terminal B through a Zener diode 21. Resistor 14, whose value is low (i.e., 50 ohms), has a signal voltage $V_s$ developed thereacross (0.2 to 1.0 Vdc) which corresponds to the signal current carried in the transmitter line, whereas the voltage developed across Zener diode 21 (i.e., 8.2 V) is maintained at a constant level and serves to power the totalizer circuits.

Signal voltage $V_s$ is applied to the input of an operational amplifier 22 whose output is applied to a charging capacitor 23 to effect time integration, the amplifier output yielding an integrated voltage $V_i$.

The voltage $V_i$ at the output of amplifier 22 is applied to the positive input of an operational amplifier 24 acting as a comparator and is caused to ramp positive until it reaches a threshold set by a network formed by resistor 25, potentiometer 26 and resistor 27 serially-connected across a Zener diode 28, the network applying a reference voltage $V_r$ to the negative input of amplifier 24 to set the threshold thereof. Diode 28 is shunted across Zener diode 21 through a resistor 29 to provide a regulated voltage source for the resistor network whose adjustable potentiometer 26 supplies a reference voltage $V_r$ to the negative input of amplifier 24.

When the integrated voltage $V_i$ from the output of amplifier 22 applied to the positive input of amplifier 24 reaches the threshold set by reference voltage $V_r$ applied to the negative input thereof, the output of amplifier 24, functioning as a comparator, goes high to produce an output signal $O_s$ which turns on transistors 30 and 31 whose bases are connected to the amplifier output. When transistor 31 is rendered conductive, it functions to discharge the integrator capacitor 23 through resistor 32 while conductive transistor 30 sets the reference level to approximately 1% of the voltage across Zener diode 28.

When the output of amplifier 22 reaches 1% of the voltage across Zener diode 28, the output of amplifier 24 will go low, thereby turning off transistors 30 and 31 to restart the integrating cycle. A network formed by serially-connected resistor 33, potentiometer 34 and resistor 35 connected across diode 28 provides current to amplifier 22 to offset the $-0.2$ V of input bias at the low end.

The totalizer circuit is configured to operate from 0 to 1 Hz for a 4 to 20 mAdc current input. Operational amplifiers 22 and 24 must consume low current and have inputs that remain active down to the negative power supply rail.

The output of amplifier 24 will be high for a brief period (approximately 2 ms) to yield an output signal only while capacitor 23 is being discharged. Output signal $O_s$ acts to trigger a non-stable multivibrator or one shot 36 which generates a pulse P (40 ms) which is applied to the driver circuit formed by transistors 37 and 38, the driver circuit being activated by pulse P to supply current to the electromagnetic counter 19 to advance the counter one step.

A capacitor 39 associated with the counter stores sufficient charge to allow operation up to 1 Hz at a 4% duty cycle, while resistor 40 and capacitor 41 help reduce the bump in Zener diode 21 during the period of counter firing. A diode 42 associated with the counter acts to absorb the energy released by the turn-off of the counter.

While there has been shown and described a preferred embodiment of a totalizer for two-wire transmitter in accordance with the invention, it will be appreciated that many changes and modifications may be made therein without, however, departing from the essential spirit thereof.

We claim:

1. In combination with a two-wire transmitter including a transducer which converts a metered variable into a corresponding current signal that is carried by the two-wire line to a receiving station provided with a D-C supply that supplies operating power to the transducer over the same line, an electronic totalizer interposed in said line and also powered by said supply, said totalizer comprising:

A. an input circuit having an impedance through which said current signal flows to develop a corresponding voltage signal, said input circuit further including a first Zener diode across which a constant voltage is developed to provide a power source;

B. a resettable integrator energized by said power source and responsive to the voltage signal to produce a time-integrated voltage that rises above a base level at a rate depending on the varying magnitude of the voltage signal;

C. a comparator energized by said power source and coupled to the integrator to produce an output signal only when the integrated voltage reaches a threshold set by a reference voltage, said output signal being fed back to said integrator to effect resetting thereof;

D. means energized by said power source and coupled to said comparator to generate a pulse each time an output signal is yielded thereby; and E. a counter energized by said power source responsive to the pulse produced by the comparator and provided with a digital display whereby the number of pulses indicated thereby represents the time-integrated total of the metered variable.

2. A totalizer as set forth in claim 1, wherein said reference voltage for the comparator is derived from an adjustable voltage divider connected across a second zener diode to which is applied a voltage derived from the first zener diode.

3. A totalizer as set forth in claim 1, wherein said integrator is constituted by an amplifier to whose input said voltage signal is applied, and a charging capacitor connected between the output and input of said amplifier.

4. A totalizer as set forth in claim 3, wherein said comparator is constituted by an operational amplifier having negative and positive inputs, the output of the integrator being applied to said positive input, the reference voltage being applied to the negative input to set the threshold.

5. A totalizer as set forth in claim 3, wherein said integrator further includes reset means responsive to said output signal to discharge said capacitor.

6. A totalizer as set forth in claim 1, wherein said means coupled to the output of the comparator is a one shot which produces a pulse in response to the output signal.

7. A totalizer as set forth in claim 6, wherein said counter is an electromagnetic device and the pulse produced by one shot is applied to a driver for actuating said counter.

* * * * *